US009079587B1

(12) United States Patent
Rupp et al.

(10) Patent No.: US 9,079,587 B1
(45) Date of Patent: Jul. 14, 2015

(54) AUTONOMOUS CONTROL IN A DENSE VEHICLE ENVIRONMENT

(71) Applicant: Ford Global Technologies, LLC, Dearborn, MI (US)

(72) Inventors: Matt Y. Rupp, Canton, MI (US); Gerald H. Engelman, Plymouth, MI (US); Alex Maurice Miller, Canton, MI (US); Timothy D. Zwicky, Dearborn, MI (US); Levasseur Tellis, Southfield, MI (US); Richard Lee Stephenson, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/180,788

(22) Filed: Feb. 14, 2014

(51) Int. Cl.
*G01C 22/00* (2006.01)
*A45C 13/00* (2006.01)
*B60Q 1/00* (2006.01)
*B60W 40/06* (2012.01)

(52) U.S. Cl.
CPC .................................. *B60W 40/06* (2013.01)

(58) Field of Classification Search
USPC ............................... 701/23; 190/102; 340/435
See application file for complete search history.

(56) References Cited

U.S. PATENT DOCUMENTS

| 6,292,742 | B1 | 9/2001 | Heimann et al. | |
|---|---|---|---|---|
| 7,990,283 | B2 | 8/2011 | Breed | |
| 8,849,494 | B1* | 9/2014 | Herbach et al. | 701/24 |
| 8,880,272 | B1* | 11/2014 | Ferguson et al. | 701/26 |
| 8,880,273 | B1* | 11/2014 | Chatham | 701/28 |
| 2005/0012602 | A1* | 1/2005 | Knoop et al. | 340/435 |
| 2009/0079839 | A1* | 3/2009 | Fischer et al. | 348/218.1 |
| 2011/0184605 | A1* | 7/2011 | Neff | 701/25 |
| 2012/0083960 | A1* | 4/2012 | Zhu et al. | 701/23 |
| 2012/0271489 | A1* | 10/2012 | Roberts et al. | 701/2 |
| 2013/0310067 | A1* | 11/2013 | Nakata et al. | 455/456.1 |
| 2013/0318214 | A1* | 11/2013 | Tebay et al. | 709/219 |

FOREIGN PATENT DOCUMENTS

| CN | 103259851 | 8/2013 |
|---|---|---|
| JP | 4821498 B2 | 9/2011 |

OTHER PUBLICATIONS

Consumer Reports Magazine: Apr. 2012, "Vehicle-to-vehicle communication can prevent crashes", 5 pages.

* cited by examiner

*Primary Examiner* — Thomas G Black
*Assistant Examiner* — Tyler Paige
(74) *Attorney, Agent, or Firm* — Frank MacKenzie; Bejin Bieneman PLC

(57) ABSTRACT

A computer in a first vehicle is programmed to receive a first set of data from at least one sensor in the first vehicle and to receive a second set of data from at least one second vehicle. The second set of data is from at least one sensor in the at least one second vehicle. The computer is further programmed to use both the first set of data and the second set of data to identify at least one feature of a road being traversed by the first vehicle.

16 Claims, 3 Drawing Sheets

AUTONOMOUS CONTROL IN A DENSE VEHICLE ENVIRONMENT

BACKGROUND

A vehicle, particularly a vehicle being operated autonomously or semi-autonomously, may obtain data concerning surrounding conditions via a variety of mechanisms, e.g., sensors or the like included in the vehicle. Sensor data can provide information concerning environmental conditions, edges of a road or lanes in a road, etc., and can be used to formulate an appropriate speed for a vehicle, an appropriate path for a vehicle, etc. However, existing vehicle sensor data suffer from limitations with respect to information that may be determined therefrom. For example, vehicle sensors may be limited in their ability to provide data for operating a vehicle autonomously or semi-autonomously. This may be especially true in dense environments, i.e., areas where a plurality of vehicles are sharing a roadway and generally affecting lines of sight, ability to navigate, etc., of other vehicles.

DRAWINGS

DESCRIPTION

Introduction

Figure 1:
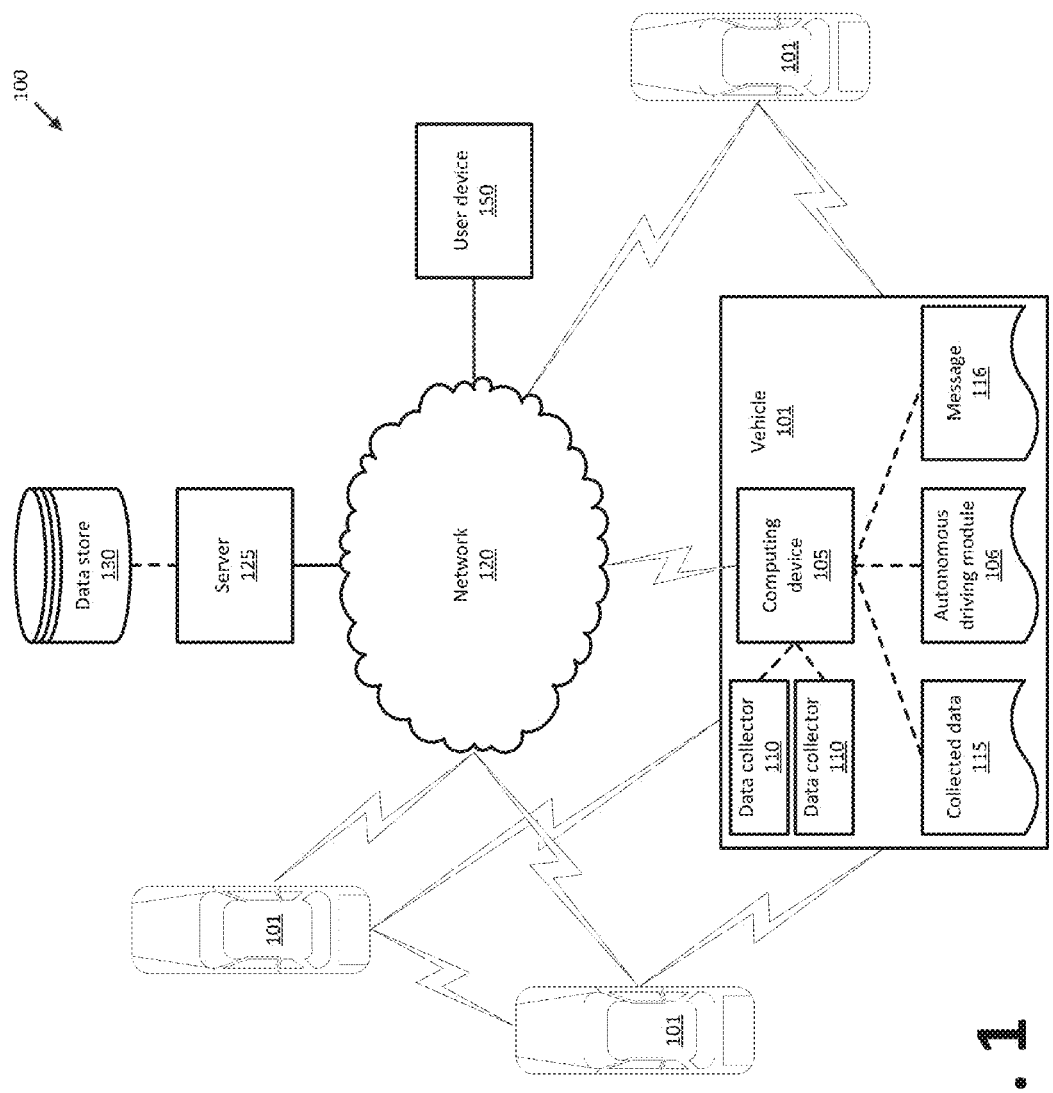
FIG. 1 is a block diagram of an exemplary autonomous vehicle sensing system.

FIG. 1 is a block diagram of an exemplary autonomous vehicle system 100 in a dense environment, i.e., a road or the like including more than one vehicle 101, such as an interstate highway, city street, etc. A computing device 105 in a vehicle 101 generally receives collected data 115 from one or more data collectors 110 and/or from one or more second vehicles 101 via one or more messages 116. The computing device 105, further includes an autonomous driving module 106, e.g., as a set of instructions stored in a memory of, and executable by a processor of, the computing device 105. The collected data 115 may be used by the first vehicle 101 computer 105 to make determinations concerning vehicle 101 operations, including operations of the vehicle 101 in an autonomous or semi-autonomous mode.

Use of data from a message 116 can provide for improved operation of a vehicle 101 compared to autonomous or semi-autonomous operation of the vehicle 101 based solely on collected data 115 from vehicle 101 data collectors 110. For example, data collectors 110 on a front of a first vehicle 101, such as cameras, radar, lidar, etc., can be limited or obstructed by a second vehicle 101 and/or features of a roadway, such as curves, hills, obstacles such as fallen objects, closed lanes, construction zones, etc. Accordingly, one or more messages 116 can provide data to a vehicle 101 computer 105 from one or more second vehicles 101 to augment and/or replace collected data 115, a second vehicle 101 is in a position to provide data that cannot be obtained by data collectors 110 in the first vehicle 101, or that is known to be more accurate than data 115 in the first vehicle 101.

Accordingly, the system 100 is useful in dense environments, i.e., roadways and the like including a plurality of vehicles 101. In general, the system 100 may assist with predicting a path that a vehicle 101 will travel based on data 115 about a surrounding environment, determining a path that the vehicle 101 should travel based on the data 115, as well as identifying obstacles, anomalies, etc. in the surrounding environment of a vehicle 101, e.g., a roadway. The system 100 may thus be advantageous where conditions in an environment surrounding a vehicle 101 do not reflect an existing map, or what is sometimes referred to as an electronic horizon, that may be stored in a vehicle 101 computer 105 memory and/or used for navigation. For example, in areas of road construction, a number of lanes available in a road, curvature slope, etc., of the road may not be reflected by a stored map. Further, sensor data collectors 110 of a first vehicle 101 may be blocked or occluded, e.g., because of a traffic jam, precipitation, fog, etc. so as to be unable to obtain data 115, or at least to obtain accurate data 115. However, by using data 115 from one or more second vehicles 101, the first vehicle 101 may construct an electronic horizon, e.g., a virtual map, that reflects present phenomena in an environment around the vehicle, such as available lanes of travel, actual road curvature, slope, obstacles, etc.

Exemplary System Elements

A vehicle 101 includes a vehicle computer 105 that generally includes a processor and a memory, the memory including one or more forms of computer-readable media, and storing instructions executable by the processor for performing various operations, including as disclosed herein. For example, the computer 105 generally includes, and is capable of executing, instructions to select an autonomous operation mode, to adjust an autonomous operation mode, to change an autonomous operation mode, etc., of the vehicle 101.

Further, the computer 105 may include more than one computing device. For example, operations ascribed herein to the computer 105 may be carried out by one or more computing devices, e.g., controllers or the like included in the vehicle 101 for monitoring and/or controlling various vehicle components, e.g., an engine control unit (ECU), transmission control unit (TCU), Power Steering Control Unit (PSCU), etc. The computer 105 is generally configured for communications on a controller area network (CAN) bus or the like. The computer 105 may also have a connection to an onboard diagnostics connector (OBD-II), or can be hardwired to specific driver control interfaces or subsystem ECU I/O (input/output). Via the CAN bus, OBD-II, and/or other wired or wireless mechanisms, the computer 105 may transmit messages to various devices in a vehicle and/or receive messages from the various devices, e.g., controllers, actuators, sensors, etc., including data collectors 110. Alternatively or additionally, in cases where the computer 105 actually comprises multiple devices, the CAN bus or the like may be used for communications between devices represented as the computer 105 in this disclosure.

In addition, the computer 105 may include or be communicatively coupled to, one or more radio frequency (RF) transceivers, receivers, and/or transmitters, and may be configured for communicating with the network 120 and/or other vehicles 101. For example, a computer 105 is generally configured for sending and receiving messages 116 (described further below) to and from other vehicles 101. Various technologies, including hardware, communication protocols, etc., are known for vehicle-to-vehicle communications. For example, messages 116 as described herein could be sent and received according to Dedicated Short Range Communications (DSRC) or the like. As is known, DSRC are relatively low-power operating over a short to medium range in a spectrum specially allocated by the United States government in the 5.9 GHz band.

In general, communications of a vehicle 101 computer 105 may include various wired and/or wireless networking technologies, e.g., cellular, Bluetooth, wired and/or wireless packet networks, etc. Further, the computer 105, e.g., in the module 106, generally includes instructions for receiving data, e.g., from one or more data collectors 110 and/or a human machine interface (HMI), such as an interactive voice response (IVR) system, a graphical user interface (GUI) including a touchscreen or the like, etc. In addition, the computer 105 generally is configured to retrieve data concerning one or more other vehicles 101 from one or more messages 116.

Generally included in instructions stored in and executed by the computer 105 is an autonomous driving module 106. Using data received in the computer 105, e.g., from data collectors 110, the server 125, etc., the module 106 may control various vehicle 101 components and/or operations without a driver to operate the vehicle 101. For example, the module 106 may be used to regulate vehicle 101 speed, acceleration, deceleration, steering, distance between vehicles and/or amount of time between vehicles, lane-change minimum gap between vehicles, left-turn-across-path minimum, time-to-arrival, intersection (without signal) minimum time-to-arrival to cross the intersection, etc. In determining an action or actions to be taken when a vehicle 101 is in an autonomous or semi-autonomous mode, the module 106 may use collected data 115 and/or data from one or more other vehicles 101 provided in one or more messages 116.

Data collectors 110 may include a variety of devices. For example, various controllers in a vehicle may operate as data collectors 110 to provide collected data 115 via the CAN bus, e.g., collected data 115 relating to vehicle speed, acceleration, etc. Further, sensors or the like, global positioning system (GPS) equipment, etc., could be included in a vehicle and configured as data collectors 110 to provide data directly to the computer 105, e.g., via a wired or wireless connection. Data collectors 110 could also include sensors or the like, e.g., medium-range and long-range sensors, for detecting, and possibly also obtaining information from, markers 160, e.g., as described further below, as well as other conditions outside the vehicle 101. For example, sensor data collectors 110 could include mechanisms such as radios, RADAR, lidar, sonar, cameras or other image capture devices, that could be deployed to detect markers 160 and/or obtain other collected data 115 relevant to autonomous operation of the vehicle 101, e.g., measure a distance between the vehicle 101 and other vehicles or objects, to detect other vehicles or objects, and/or to detect road conditions, such as curves, potholes, dips, bumps, changes in grade, etc.

A memory of the computer 105 generally stores collected data 115. Collected data 115 may include a variety of data collected in a vehicle 101 from data collectors 110, including data 115 obtained from one or more markers 160. Examples of collected data 115 are provided above and below, e.g., with respect to markers 160, and moreover, data 115 may additionally include data calculated therefrom in the computer 105. In general, collected data 115 may include any data that may be gathered by a collection device 110 and/or computed from such data. Accordingly, collected data 115 could include a variety of data 115 related to vehicle 101 operations and/or performance, as well as data related to in particular relating to motion of the vehicle 101. For example, in addition to data 115 obtained from a marker 160 such as discussed below, collected data 115 could include data concerning a vehicle 101 speed, acceleration, braking, lane changes and or lane usage (e.g., on particular roads and/or types of roads such as interstate highways), average distances from other vehicles at respective speeds or ranges of speeds, and/or other data 115 relating to vehicle 101 operation.

A message 116 may include a variety of data concerning operations of a vehicle 101. For example, a current specification for DSRC, promulgated by the Society of Automotive Engineers, provides for including a wide variety of vehicle 101 data in a message 116, including vehicle 101 position (e.g., latitude and longitude), speed, heading, acceleration status, brake system status, transmission status, steering wheel position, etc. However, messages 116 are not limited to data elements included in the DSRC standard, or any other standard. For example, a message 116 can include a wide variety of collected data 115 obtained from a vehicle 101 data collectors 110, such as camera images, radar or lidar data, data from infrared sensors, etc. Accordingly, a first vehicle 101 could receive collected data 115 from a second vehicle 101, whereby the first vehicle 101 computer 105 could use the collected data 115 from the second vehicle 101 as input to the autonomous module 106 in the first vehicle 101, i.e., to determine autonomous or semi-autonomous operations of the first vehicle 101.

Advantageously, a message 116 may include historical data 115 from a vehicle 101. That is, in addition to reporting data 115 in messages 116 on a real-time or near real-time basis, a vehicle 101 may include data 115 relating to one or more periods of time prior to a current or near-current time associated with a message 116. For example, a message 116 could indicate a vehicle 101 position (e.g., latitude and longitude), speed, and heading for a plurality of times. Such data 115 may sometimes be referred to as "breadcrumb" data because a past and/or projected path for a vehicle 101 may be determined from such data 115. Further, breadcrumb data is not limited to data 115 relating to a path of a vehicle 101 providing such data 115. For instance, a vehicle 101 could provide breadcrumb data concerning a variety of phenomena that could be included in collected data 115 and provided in a message 116, e.g., a detected position, speed, heading, etc. of another vehicle 101, a roadway, weather conditions such as precipitation, temperature, etc., and object on a road, etc.

The network 120, as mentioned above, represents one or more mechanisms by which a vehicle computer 105 may communicate with a remote server 125 and/or a user device 150. Accordingly, the network 120 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 802.11, etc.), local area networks (LAN) and/or wide area networks (WAN), including the Internet, providing data communication services.

The server 125 may be one or more computer servers, each generally including at least one processor and at least one memory, the memory storing instructions executable by the processor, including instructions for carrying out various steps and processes described herein. The server 125 may include or be communicatively coupled to a data store 130 for storing collected data 115 received from one or more vehicles 101.

A user device 150 may be any one of a variety of computing devices including a processor and a memory, as well as communication capabilities. For example, the user device 150 may be a portable computer, tablet computer, a smart phone, etc. that includes capabilities for wireless communications using IEEE 802.11, Bluetooth, and/or cellular communications protocols. Further, the user device 150 may use such communication capabilities to communicate via the network 120 including with a vehicle computer 105. A user device 150 could communicate with a vehicle 101 computer 105 the other mechanisms, such as a network in the vehicle 101, a known protocols such as Bluetooth, etc. Accordingly, a user device 150 may be used to carry out certain operations herein ascribed to a data collector 110, e.g., voice recognition functions, cameras, global positioning system (GPS) functions, etc., in a user device 150 could be used to provide data 115 to the computer 105. Further, a user device 150 could be used to provide a human machine interface (HMI) to the computer 105.

Exemplary Environment

Figure 2:
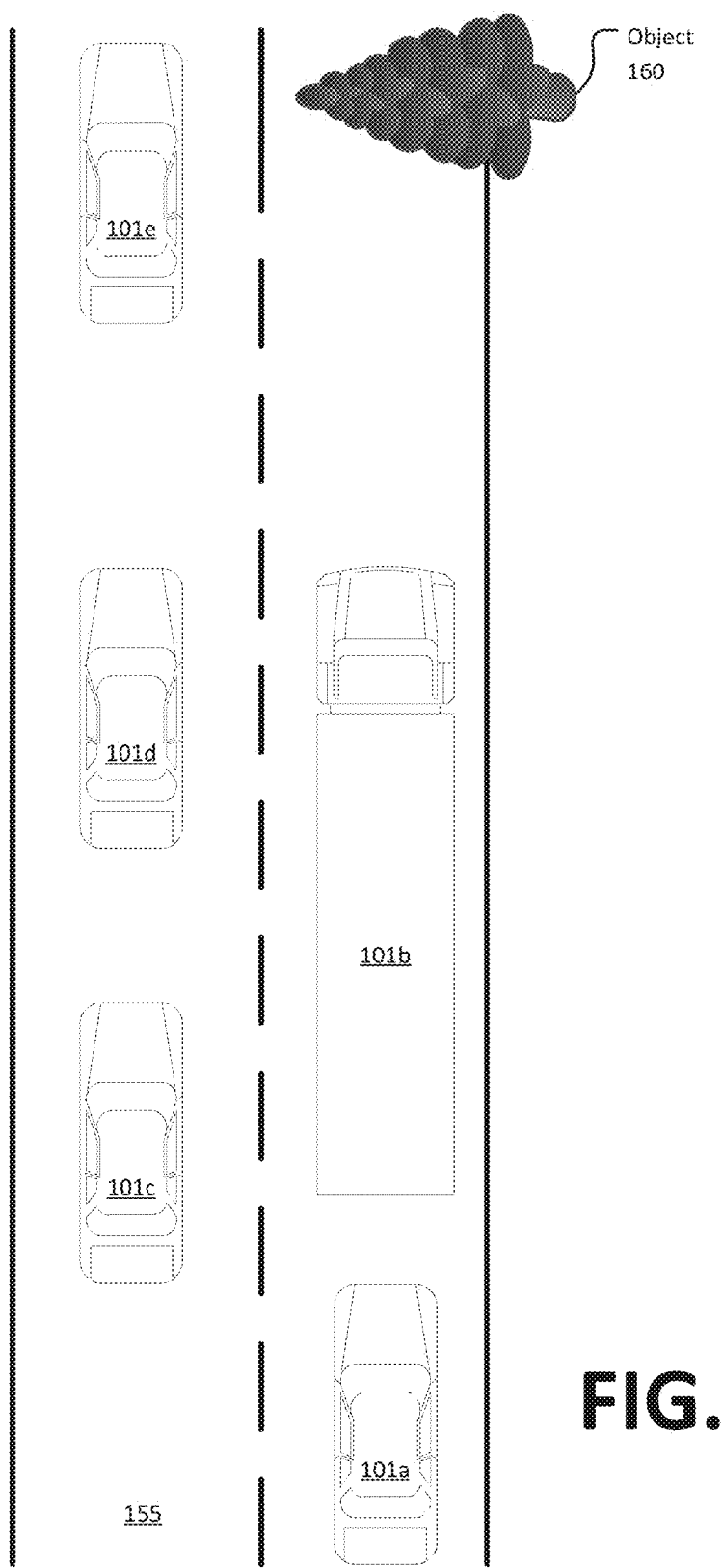
FIG. 2 is a block diagram of a vehicle roadway.

FIG. 2 is a block diagram of a roadway 155 being traversed by a plurality of vehicles 101a, 101b, 101c, 101d, and 101e. In general, as discussed above, the various vehicles 101 may use data collectors 110 to obtain various collected data 115, and to communicate various collected data 115 to other vehicles 101 via one or more messages 116.

Accordingly, each vehicle 101 may obtain data 115 not otherwise available to it. For example, the roadway 155 could be blocked by an object 160. A first vehicle 101a could receive one or more messages 116, from one or more second vehicles 101, including data 115 about the object 160 where such data 115 about the object 160 would not otherwise be available to the first vehicle 101a. For example, as illustrated in FIG. 2, sensor data collectors 110 in the first vehicle 101a could be blocked from obtaining information about the object 160 by a second vehicle 101b. To take another example, a roadway 155 could curve, change in elevation, present a traffic barrier, lane closure, etc., preventing a first vehicle 101 from obtaining data 115 to recognize and/or avoid an object and/or feature of the roadway 155 affecting travel.

Exemplary Process Flows

Figure 3:
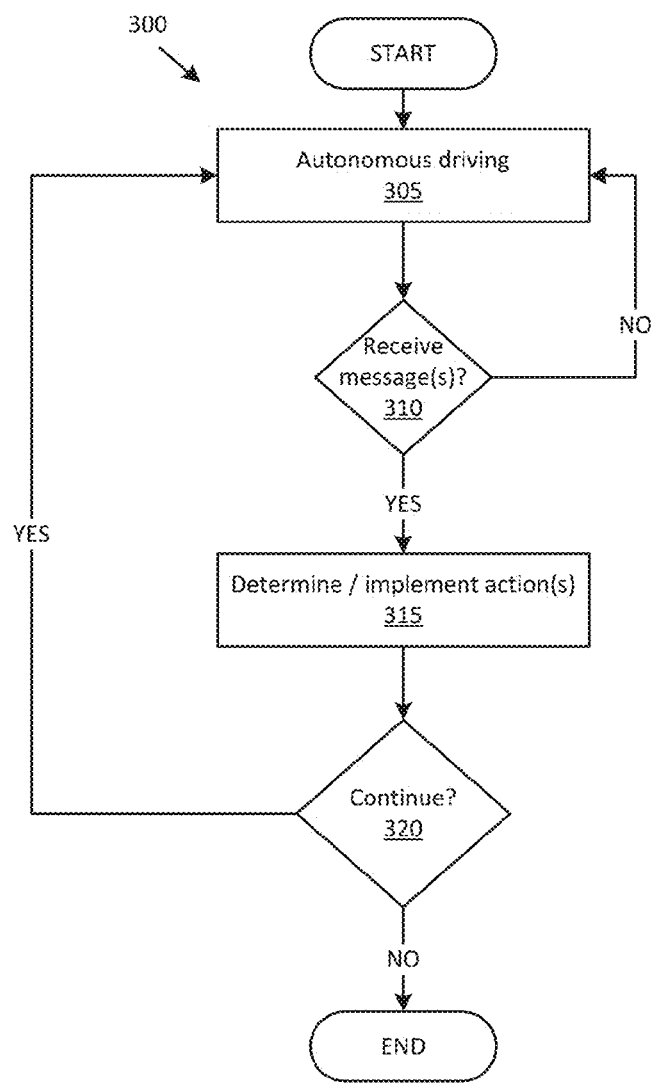
FIG. 3 is a diagram of an exemplary process for an autonomous vehicle in a dense environment.

FIG. 3 is a diagram of an exemplary process for an autonomous vehicle 101 sensing system in an autonomous mode, generally carried out according to instructions in a first vehicle 101 computer 105.

The process 300 begins in a block 305, in which a vehicle 101 conducts autonomous driving operations. That is, the vehicle 101 is operated partially or completely autonomously, i.e., a manner partially or completely controlled by the autonomous driving module 106, which may be configured to operate the vehicle 101 according to collected data 115. For example, all vehicle 101 operations, e.g., steering, braking, speed, etc., could be controlled by the module 106 in the computer 105. It is also possible that, in the block 220, the vehicle 101 may be operated in a partially autonomous mode, also sometimes referred to as a semi-autonomous mode (i.e., partially manual, fashion, where some operations, e.g., braking, could be manually controlled by a driver, while other operations, e.g., including steering, could be controlled by the computer 105. Likewise, the module 106 could control when a vehicle 101 changes lanes. Further, it is possible that the process 200 could be commenced at some point after vehicle 101 driving operations begin, e.g., when manually initiated by a vehicle occupant through a user interface of the computer 105.

A vehicle 101 in an autonomous or semi-autonomous mode generally transmits and receives, or at least listens for, messages 116. Moreover, it is to be understood that vehicles 101 not in an autonomous or semi-autonomous mode and/or not including an autonomous module 106 or lacking some or all autonomous operating capabilities, may include data collectors 110, obtain collected data 115, and provide messages 116. Specific data elements included in a message 116 may be according to a known standard or protocol, such as DSRC, but also, as mentioned above, may include collected data 115 of a vehicle 101 not included in any current standard or protocol. For example, in addition to data 115 relating to position, speed, etc., a vehicle 101 may provide in a message 116 sensor data 115 such as radar, lidar, etc. data, images, sound, etc.

In any event, in a block 310 that follows the block 305, the computer 105 determines whether it has received one or more messages 116 from one or more second vehicles 101. If not, the process 300 returns to the block 305. Otherwise, the process 300 proceeds to a block 315.

In the blocks 315-330, each of which are described in turn below, the computer 105, e.g., in the module 106, determines whether any actions are appropriate in the vehicle 101 to carry out semi-autonomous or autonomous operations. In making such determination, the computer 105 carries out autonomous or semi-autonomous operations as described above with respect to the block 305, but additionally or alternatively uses as input for determining at least one autonomous operation data obtained from one or more second vehicles 101 in one or more messages 116. The computer 105 may then implement such determined autonomous operation. Possible autonomous operations or actions include, by way of example and without limitation, braking, acceleration, a lane change, and a change in distance from a lead vehicle 101, i.e., a vehicle ahead of a vehicle 101.

For example, assume that a first vehicle 101 is following a second vehicle 101 along a hilly roadway. Further, assume that the first vehicle 101 is operating in at least a semi-autonomous mode such that an adaptive cruise control is being used. That is, the first vehicle 101 is using radar or the like to detect, and measure a distance from, the second vehicle 101. However, in a hilly environment, especially if the first vehicle 101 has a stiff suspension, radar may not be effective to detect the second vehicle 101, e.g., where the first vehicle 101 is moving up an incline and the second vehicle 101 is at or over a crest of the incline. Accordingly, collected data 115 from the second vehicle 101, e.g., reporting a position, speed, heading, etc. of the second vehicle 101 may be included in a message 116 and then used by the computer 105 in the first vehicle 101 to maintain a predetermined speed and/or a pre-determined distance from the second vehicle 101. Further, a vehicle 101 computer 105 may, as mentioned above, receive messages 116 from a plurality of second vehicles 101. Moreover, the computer 105 may use data 115 from a plurality of second vehicles 101 in formulating an action or actions when in an autonomous or semi-autonomous mode. For example, confidence of an autonomous module 106 may increase where, or to the extent that, each of a plurality of second vehicles 101 provide data 115 consistent with one another, e.g., indicating an object 160 in a roadway 155, indicating a particular condition in a roadway 155, e.g., water, ice, etc., indicating a desired path in a roadway 155, e.g., a lane change to avoid an object 160 such as a construction barrier, etc.

Accordingly, in the block 315, obtains current collected data 115, as well as current or near-current data received in one or more messages 116. In addition, the computer 105 analyzes messages 116 for historical data, e.g., DSRC "breadcrumb" data or the like. That is, the computer 105 may use data in one or more messages 116 to determine position, speed, and/or other attributes such as acceleration, deceleration, etc., of one or more vehicles 101 at more than one point in time, i.e., for a period of time.

Next, in a block 320, a computer 105 in a first vehicle 101, using historical or breadcrumb data 115 from a plurality of second vehicles 101, in addition to real-time or near real-time data 115 collected in the first vehicle 101, can construct a so-called electronic horizon, e.g., a map of an environment surrounding the first vehicle 101 built locally in the vehicle 101, e.g., in the computer 105. For example, a vehicle 101 may rely on a stored map to navigate using a global positioning system (GPS) application. The map, e.g., stored in a memory of the computer 105 and/or an associated device in the vehicle 101, may include information about a roadway 155, a number of lanes available, the direction of traffic flow, intersections, entrance ramps, exit ramps, etc. accordingly, such a stored map may be used to construct an initial electronic horizon.

However, because the information from this electronic horizon relies on GPS to position the vehicle (101) relative to the infrastructure, location determinations are limited to the performance of the GPS system within the vehicle 101. The accuracy of this mechanism in many cases will not allow the vehicle 101 to be positioned in the exact lane of traffic on the road 155, or in some cases, where roadways 155 run substantially parallel in close proximity to one another, or where exit/entrance/service/turnaround lanes are present. Also, information in such a stored map may not reflect actual conditions, e.g., when one or more objects 160 obstruct some or all of the roadway 155, when a construction zone or the like is implemented in a roadway 155, etc. In these cases, available lanes of travel, intersections, available exit ramps and/or entrance ramps, etc., may not be as reflected in a stored map. However, by using data 115 from surrounding vehicles 101, e.g., position data, speed data, heading data, etc., a vehicle 101 computer 105 can construct a virtual map, e.g., electronic horizon, reflecting actual conditions or features of an environment around a vehicle 101, e.g., of a roadway 155. Such constructed virtual map may indicate available lanes of travel, obstacles such as objects 160 in the roadway 155 (sometimes objects 160 and/or second vehicles 101 are referred to as "targets"), as well as other conditions, such as the weather conditions, a condition of a road surface, e.g., presence of ice, debris, etc., affecting travel via a roadway 155, etc. In general, as used herein, an "environment" around a vehicle 101 may refer to a predetermined radius around the vehicle 101, e.g., 500 meters, 1000 meters, etc., and/or a predetermined distance ahead of and/or behind a vehicle 101 on a roadway 155, etc.

Following the block 320, in a block 325, the first vehicle 101 computer 105 estimates the first vehicle 101 path based on collected data 115 in the first vehicle 101. That is, using information concerning a speed, position, acceleration/deceleration, etc. of the first vehicle 101, the computer 105 can project a likely path for the first vehicle 101 with respect to the electronic horizon.

Following the block 325, in a block 330, the first vehicle 101 computer 105 analyzes, e.g., aggregates, all local electronic horizon, e.g., map, information such as may have been generated by fusion of data 115 from the first vehicle 101 as well as one or more second vehicles 101 as described above with respect to the block 320. That is, using statistical analysis techniques or the like to estimate a probable environment and target locations (e.g., according to X, Y, Z coordinates), velocity/acceleration vectors (e.g., again, according to X, Y, Z coordinates), as well as upcoming or connecting roadways/vehicle paths, likely paths, etc.

Then, after the block 330, in a block 335, the computer 105 provides determination of a predicted vehicle 101 path, possibly one or more target locations and/or paths, and environmental data, e.g., lane availability, road friction, etc., to the module 106 and/or any autonomous and/or semi-autonomous modules in the vehicle 101.

In the block 340, following the block 330, the computer 105 determines whether the process 300 should continue. For example, the process 300 may end if autonomous driving operations end and a driver resumes manual control, if the vehicle 101 is powered off, etc. In any case, if the process 300 should not continue, the process 300 ends following the block 310. Otherwise, the process 300 proceeds to the block 305.

CONCLUSION

Computing devices such as those discussed herein generally each include instructions executable by one or more computing devices such as those identified above, and for carrying out blocks or steps of processes described above. For example, process blocks discussed above are embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A method implemented in a computer in a first vehicle, the computer being configured to operate the vehicle in an autonomous mode, the method comprising:
   receiving a first set of data from at least one sensor in the first vehicle;
   receiving a plurality of sets of data including at least a second set of data from a second vehicle and a third set of data from a third vehicle, wherein the at least second and third sets of data are respectively from at least one sensor in the second vehicle and third vehicle;
   analyzing the first and at least second and third sets of data using statistical techniques;
   generating a virtual map of a probable environment around the first vehicle based on the analysis; and
   predicting a path of the first vehicle based on the virtual map.

2. The method of claim 1, further comprising determining at least one autonomous action for the first vehicle, based on the predicted path.

3. The method of claim 2, wherein the at least one autonomous action is at least one of braking, acceleration, a lane change, and a change in distance from a lead vehicle.

4. The method of claim 1, wherein the virtual map includes at least one feature, the at least one feature including available one or more lanes of travel, curvature of a roadway, slope of a roadway, a highway entrance ramp, an obstacles, a weather condition, and a condition of a road surface.

5. The method of claim 4, wherein the at least one feature includes at least one target including one of an object proximate to the roadway, the second vehicle and the third vehicle.

6. The method of claim 1, wherein each of the second and third sets of data from respectively the second and third vehicles includes at least one of radar data, lidar data, and image data.

7. The method of claim 1, wherein some but not all of the second set of data is provided in a Dedicated Short Range Communications (DSRC) message.

8. The method of claim 1, further comprising:
   prioritizing, in the statistical analysis, data from the at least second and third sets of data that is associated with a greater accuracy than data from the first set of data.

9. A system, comprising a computer in a vehicle, the computer programmed to operate the vehicle in an autonomous mode and comprising a processor and a memory, wherein the computer is further programmed to:
   receive a first set of data from at least one sensor in the first vehicle;
   receive a plurality of sets of data including at least a second set of data from a second vehicle and a third set of data from a third vehicle, wherein the at least second and third sets of data are respectively from at least one sensor in the second vehicle and third vehicle;
   analyzing the first and at least second and third sets of data using statistical techniques;
   generating a virtual map of a probable environment around the first vehicle based on the analysis; and
   predicting a path of the first vehicle based on the virtual map.

10. The system of claim 9, wherein the computer is further programmed to determine at least one autonomous action for the first vehicle based on the virtual map.

11. The system of claim 10, wherein the at least one autonomous action is at least one of braking, acceleration, a lane change, and a change in distance from a lead vehicle.

12. The system of claim 9, wherein the virtual map includes at least one feature, the at least one feature including available one or more lanes of travel, curvature of a roadway, slope of a roadway, a highway entrance ramp, an obstacles, a weather condition, and a condition of a road surface.

13. The system of claim 12, wherein the at least one feature includes at least one target including one of an object proximate to the roadway and the second vehicle.

14. The system of claim 9, wherein each of the second and third sets of data from respectively the second and third vehicles includes at least one of radar data, lidar data, and image data.

15. The system of claim 9, wherein some but not all of the second set of data is provided in a Dedicated Short Range Communications (DSRC) message.

16. The system of claim 9, wherein the computer is further programmed to:
   prioritize, in the statistical analysis, data from the at least second and third sets of data that is associated with a greater accuracy than data from the first set of data.

* * * * *